(12) United States Patent
Gilboa-Solomon et al.

(10) Patent No.: US 10,387,454 B2
(45) Date of Patent: Aug. 20, 2019

(54) METHOD FOR CREATING EFFICIENT APPLICATION ON HETEROGENEOUS BIG DATA PROCESSING PLATFORM

(71) Applicant: International Business Machines Corporation, Armonk, NY (US)

(72) Inventors: Flora Gilboa-Solomon, Haifa (IL); Eugene Walach, Haifa (IL); Simona Rabinovici-Cohen, Haifa (IL)

(73) Assignee: International Business Machines Corporation, Armonk, NY (US)

(*) Notice: Subject to any disclaimer, the term of this patent is extended or adjusted under 35 U.S.C. 154(b) by 385 days.

(21) Appl. No.: 15/225,828

(22) Filed: Aug. 2, 2016

(65) Prior Publication Data
US 2018/0039687 A1 Feb. 8, 2018

(51) Int. Cl.
G06F 17/30 (2006.01)
G06F 16/28 (2019.01)
G06F 16/21 (2019.01)

(52) U.S. Cl.
CPC .......... G06F 16/285 (2019.01); G06F 16/21 (2019.01)

(58) Field of Classification Search
None
See application file for complete search history.

(56) References Cited

U.S. PATENT DOCUMENTS

| | | | |
|---|---|---|---|
| 9,218,213 B2 | 12/2015 | Steinder et al. | |
| 2003/0135621 A1 | 7/2003 | Romagnoli | |
| 2011/0296052 A1* | 12/2011 | Guo | G06F 9/5077 709/240 |
| 2015/0066990 A1* | 3/2015 | Agarwal | G06F 17/30958 707/798 |

FOREIGN PATENT DOCUMENTS

| | | |
|---|---|---|
| CN | 102193826 | 12/2012 |
| CN | 103631657 | 3/2014 |
| EP | 1356382 | 1/2008 |

OTHER PUBLICATIONS

Satuluri et al, Symmetrizations for Clustering Directed Graphs, Mar. 2011, pp. 343-354.*
Matias et al, Modeling Heterogeneity in Random Graphs Through Latent Space Models: A Selective Review, 2014, pp. 55-74.*
Antony Arokiasamy et al., "Heterogeneous Workflows With Spark At Netflix", Spark Summit 2016 Data Science and Engineering At Scale, Jun. 6-8, 2016 • San Francisco.

(Continued)

Primary Examiner — Alex Gofman
(74) Attorney, Agent, or Firm — Gregory J. Kirsch (57) ABSTRACT

This invention relates to a method and system for creating Big Data applications that can be executed on heterogeneous clusters. The applications can be executed on a particular platform, such as SPARK or UIMA-AS, but the method and system are able to translate the input to these targeted platforms without the developer needing to tailor the application specifically to the platform. The method and system are based on the use of an execution dependency graph, a cluster configuration, and a data size to create a stages table. The stages table is then optimized to increase the overall efficiency of the heterogeneous cluster. The stages table is then translated into a platform specific Big Data application.

18 Claims, 7 Drawing Sheets

(56) References Cited

OTHER PUBLICATIONS

Keliang Zhang et al., "Task Scheduling for GPU Heterogeneous Cluster", 2012 IEEE International Conference on Cluster Computing Workshops.
Mohd Helmi Rosli et al., "Heuristic Testing on Task Partitioning for Heterogeneous Cluster", Computing and Convergence Technology (ICCCT), 2012 7th International Conference on Date of Conference: Dec. 3-5, 2012, pp. 385-390.
Michael LeBeane et al., "Data Partitioning Strategies for Graph Workloads on Heterogeneous Clusters", Proceeding SC '15 Proceedings of the International Conference for High Performance Computing, Networking, Storage and Analysis Article No. 56, 2015.

* cited by examiner

```
{"MedSievePipeline":
    {"pipelineID": "13ff34a0-4885-11e4-9de2-0002a5d5c523",
     "pipelineName": "MGReportGeneration",
     "templateType": "ImagingStudy",
     "pipelineResult":"C",
     "preferredEngine": ["SPARK"],
     "analytics":
        [{"name":"A",
          "locationInTemplate":{"object": "series", "number": 0},
          "dependOn":[],
          "nodeType": {"minimumMemory": 0, "estimatedExecutionTimeOnCPU": 10, "GPUModel": "", "CPUType": ""},
          "estimatedExecutionTimeOnGPU": 10, "GPUModel": "", "CPUType": ""},
          "inputParams":{"saveExplanation":0}
         },
         {"name":"B",
          "locationInTemplate":{"object": "series", "number": 0},
          "dependOn":["A"],
          "nodeType": {"minimumMemory": 0, "estimatedExecutionTimeOnCPU": 20, "GPUModel": "", "CPUType": ""},
          "estimatedExecutionTimeOnGPU": 2, "GPUModel": "", "CPUType": ""},
          "inputParams":{"modelURI":"@path(MGReportGeneration/MG_semantic_model.mat)"}
         },
         {"name":"C",
          "locationInTemplate":{"object": "series", "number": 0},
          "dependOn":["B"],
          "nodeType": {"minimumMemory": 0, "estimatedExecutionTimeOnCPU": 5, "GPUModel": "", "CPUType": ""},
          "estimatedExecutionTimeOnGPU": 5, "GPUModel": "", "CPUType": ""},
          "inputParams":{"saveExplanation":1}
         }
        ]
    }
}
```

FIG. 7

METHOD FOR CREATING EFFICIENT APPLICATION ON HETEROGENEOUS BIG DATA PROCESSING PLATFORM

FIELD OF TECHNOLOGY

The present invention in the technical field of Big Data processing. More specifically, the present invention relates to the seamless processing of data across multiple platforms without the need to provide a tailored approach for each platform.

BACKGROUND OF THE INVENTION

As Big Data applications areas have grown, the demand for software platforms for performing analytics has increased. As such, multiple vendors provide their own tailored platforms for developers wanting to create Big Data analytics products.

In conventional approaches to Big Data processing, multimodal analytic developers will have to learn and specifically develop for each particular platform. These platforms, including the open source Apache SPARK and Unstructured Information Management Architecture Asynchronous Scaleout (UIMA-AS), will each provide their own interface.

The recent Big Data processing platforms, such as SPARK, have a more flexible programming model than earlier platforms, such as Hadoop, and this flexibility provides a new power in the "application space" to create optimized applications. This means that applications in SPARK can actually rewrite the way data is partitioned, shuffled, or aggregated, which is not necessarily possible in Hadoop MapReduce.

What is needed is a method that takes advantage of a platforms ability to rewrite the way data is partitioned, shuffled, or aggregated and provides for creating efficient applications that consider data and task partition as well as task-to-machine mapping.

SUMMARY OF INVENTION

This summary is provided with the understanding that it will not be used to limit the scope or meaning of the claims.

The present invention, in an embodiment, relates to providing a method for reducing the development effort for creating Big Data applications. By creating an application development architecture that can address heterogeneous application platforms, the developer can avoid tailoring a solution for any particular platform. This can reduce development time and improve the maintainability of the application.

The invention, in an embodiment, further relates to parallel computing. While some aspects relate to parallelizing compilers, which extract parallelism from sequential code, or special-purpose parallel programming languages, the invention, in an embodiment, is able to improve parallelism by partitioning the operating steps and optimizing the data dependencies across the cluster.

The invention, in an aspect, allows developers to specify computation and communication patterns in a way that can be translated to multiple Big Data platforms and is independent of the target architecture. This model conveniently creates concurrency in the Big Data application, and the target platform runtime system manages the execution of the parallel computations on the cluster. The invention, in an embodiment, can generate optimal or near-optimal concurrency in computation and communication tasks in the application to reduce makespan.

In embodiments, method for generating applications comprise receiving a heterogeneous weighted execution dependency graph, a cluster configuration, and a data size, selecting a number representing a quantity of cases to consider, defining at least one work item for the number representing the quantity of cases, creating a stages table based on the at least one work item, updating the number representing the quantity of cases to the number of cases in the stages table, and translating the stages table to an application for a processing platform.

In further embodiments, methods for creating a creating a stages table comprise finding a set of ready work items for a current stage, creating a bi-partite weighted colored graph between a set of machines in a cluster and the ready work items, selecting a work item for each machine in the cluster, and adding the selected work item to each machine.

Numerous other embodiments are described throughout herein. All of these embodiments are intended to be within the scope of the invention herein disclosed. Although various embodiments are described herein, it is to be understood that not necessarily all objects, advantages, features or concepts need to be achieved in accordance with any particular embodiment. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein.

The methods and systems disclosed herein may be implemented in any means for achieving various aspects, and may be executed in a form of a machine-readable medium embodying a set of instructions that, when executed by a machine, cause the machine to perform any of the operations disclosed herein. These and other features, aspects, and advantages of the present invention will become readily apparent to those skilled in the art and understood with reference to the following description, appended claims, and accompanying figures, the invention not being limited to any particular disclosed embodiment(s).

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and the invention may admit to other equally effective embodiments.

Other features of the present embodiments will be apparent from the Detailed Description that follows.

DETAILED DESCRIPTION OF THE EMBODIMENTS

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention. Electrical, mechanical, logical and structural changes may be made to the embodiments without departing from the spirit and scope of the present teachings. The following detailed description is therefore not to be taken in a limiting sense, and the scope of the present disclosure is defined by the appended claims and their equivalents.

Figure 1:
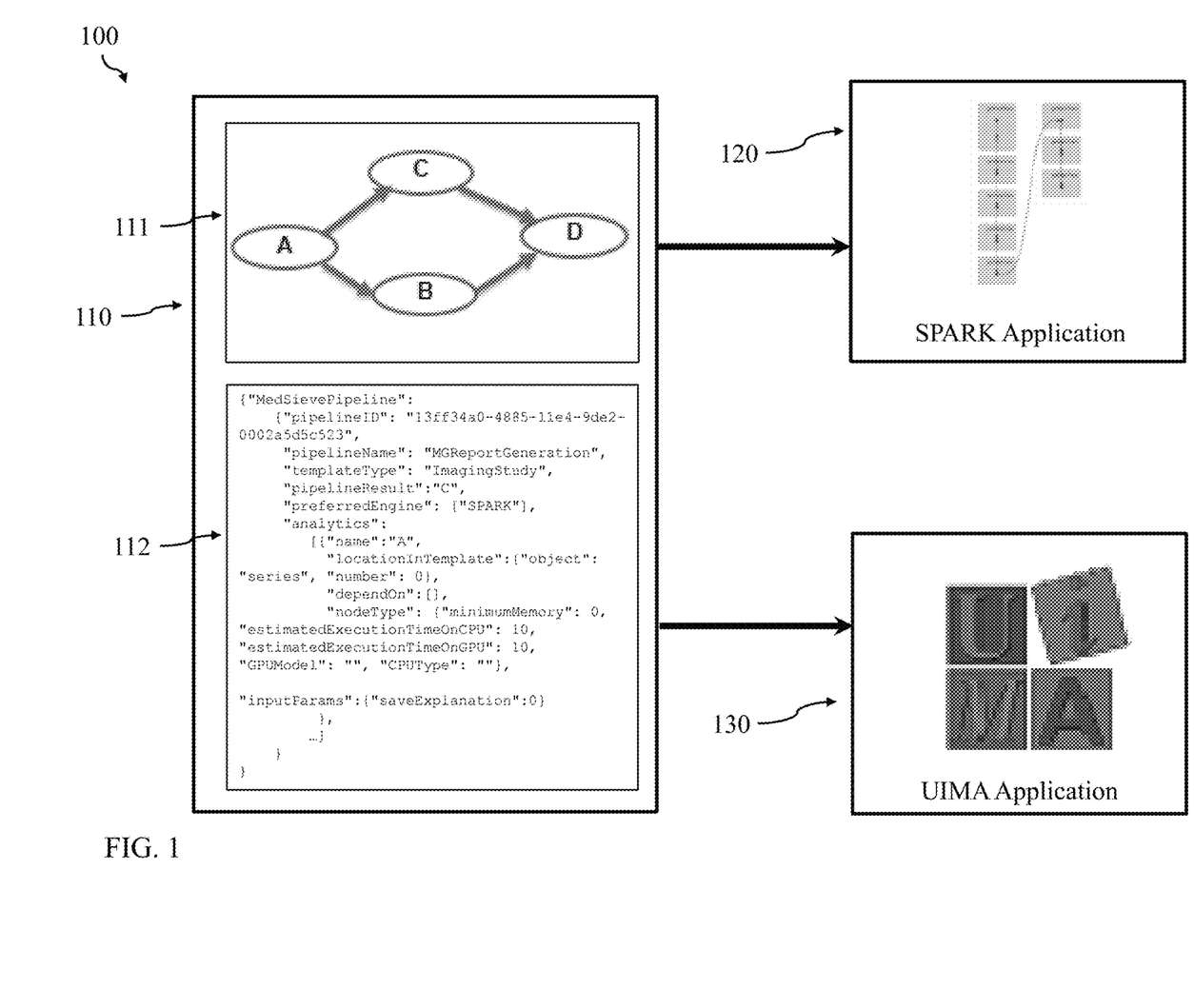
FIG. 1 illustrates a process of the invention, according to an embodiment of the present invention.

FIG. 1 illustrates a process of the invention according to an embodiment. The high level process 100 depicted in FIG. 1 shows how the pipeline descriptor 110 is applied. The pipeline descriptor 110 contains an execution dependency graph 111. In this example execution dependency graph 111, module B and module C depend on the results of module A. module D depends on the results of both module B and module C. The execution dependency graph has an associated textual description 112, which is referred to as the Pipeline Descriptor.

The heterogeneous modules of the execution dependency graph are heterogeneous because their estimated execution times differ in the various nodes in the cluster. This can happen for example if all nodes/machines in the cluster do not have the same hardware. For example if the cluster has some, but not all nodes with GPUs, and there is a module that executes faster on a GPU than on a CPU, then that module is a heterogeneous module. In another example, if a module requires some resources and setup, such as the Patient Similarity pipeline, and there is a specific node in the cluster that already has fast access to the resources and setup, then that module is a heterogeneous module. Heterogeneous modules can also occur if the cluster includes some nodes with older, slower hardware and some nodes with newer, faster hardware. A dependency graph with heterogeneous modules can be referred to as a heterogeneous dependency graph.

Figure 7:
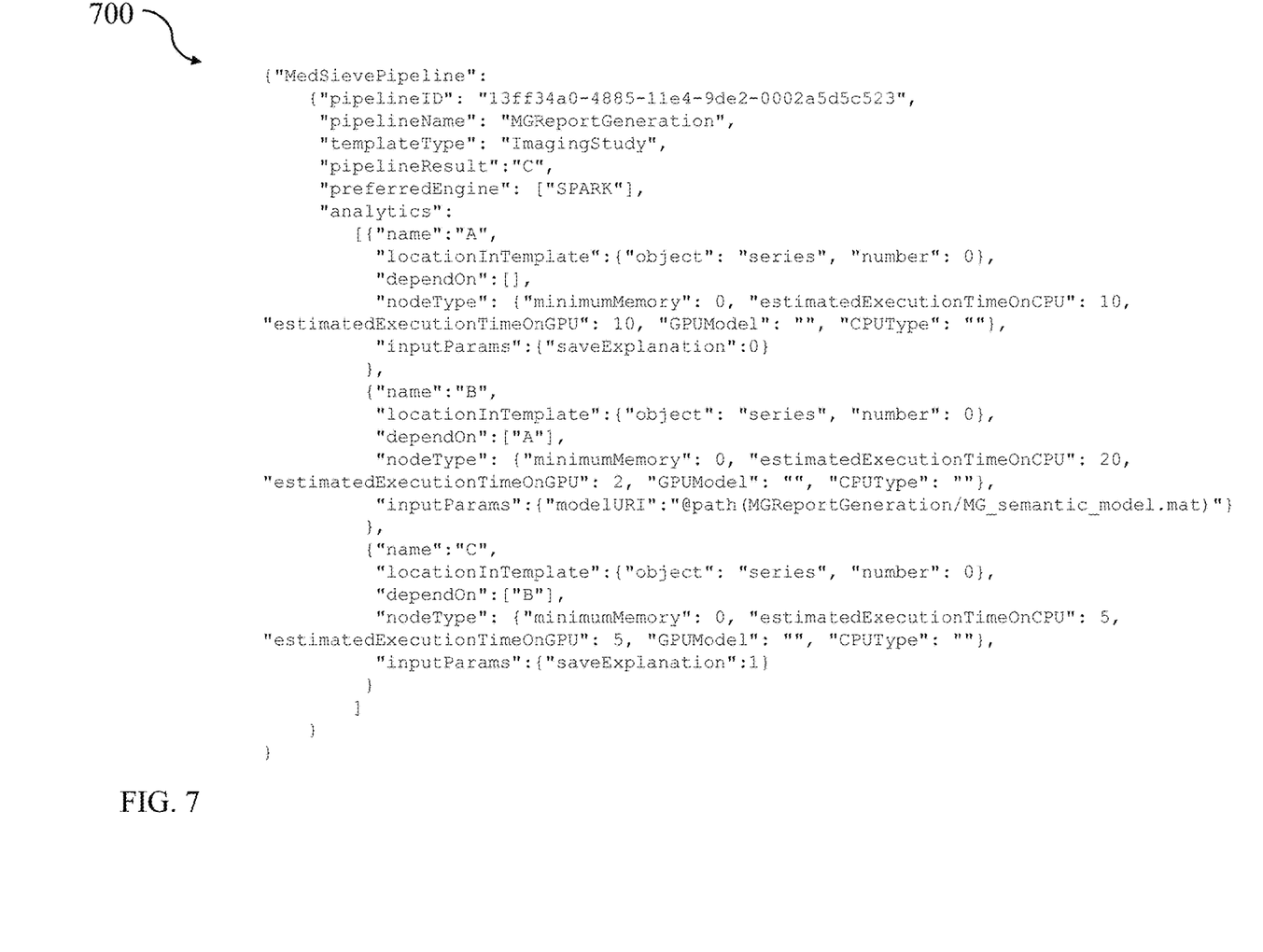
FIG. 7 shows a Pipeline Descriptor, according to an embodiment of present invention.

The conversion engine receives as an input the Pipeline Descriptor. It also receives the data size and cluster configuration. FIG. 7 shows an example of a Pipeline Descriptor 700, according to an embodiment of present invention. The Pipeline Descriptor 700 contains a number of parameters defining, among others, the pipelineID, the pipelineName, the templateType, the pipelineResult, and the preferredEngine. The analytics block of the Pipeline Descriptor 700 includes parameters such as the estimated execution time of each one of the analytics module on the different types of cluster nodes. The total execution time can be extracted from these values by summing those in the path.

The conversion engine is then able to generate an application that is in the format to be processed by e.g. SPARK or by UIMA.

The conversion engine, in an embodiment, operates so as to minimize the makespan of the application. The makespan is the time from the beginning of the first task until the completion of the final task. By minimizing makespan, the conversion engine aids in creating an efficient application that finishes the job as fast as possible. It also aids in the releasing of resources earlier and improves the efficiency of the platform. That is, some Big Data platforms, e.g. the SPARK platform in particular configurations, have static partitioning of resources. With static partitioning, each application is given a set of resources and holds onto those resources for the whole application duration. Operating so as to minimize the makespan of the application can improve the overall efficiency in such platforms.

In an embodiment, the resulting application, such as the SPARK application 120 or the UIMA application 130, are able to perform multimodal analytics and utilize analytics modules written in various programming languages, such as Matlab, Java, and C. The application accumulates the results of the previous modules so that the results of all modules that preceded the current module are available for use by the current module.

The data, in an embodiment of the present invention, comprises data items with a unique key to each item. Additionally, data items have a case identifier (case_id), and all related data items that need to be processed together by one of the modules have the same case_id. A data item with a particular case_id can be processed independently of those data items not having that particular case_id. In this disclosure we assume all the data items are independent namely the number of case_ids in the data set is the same as the number of unique keys of the data items. We also assume that the application is mostly compute-intensive and the analytics modules perform a lot of computation on the same piece of data.

Figure 2:
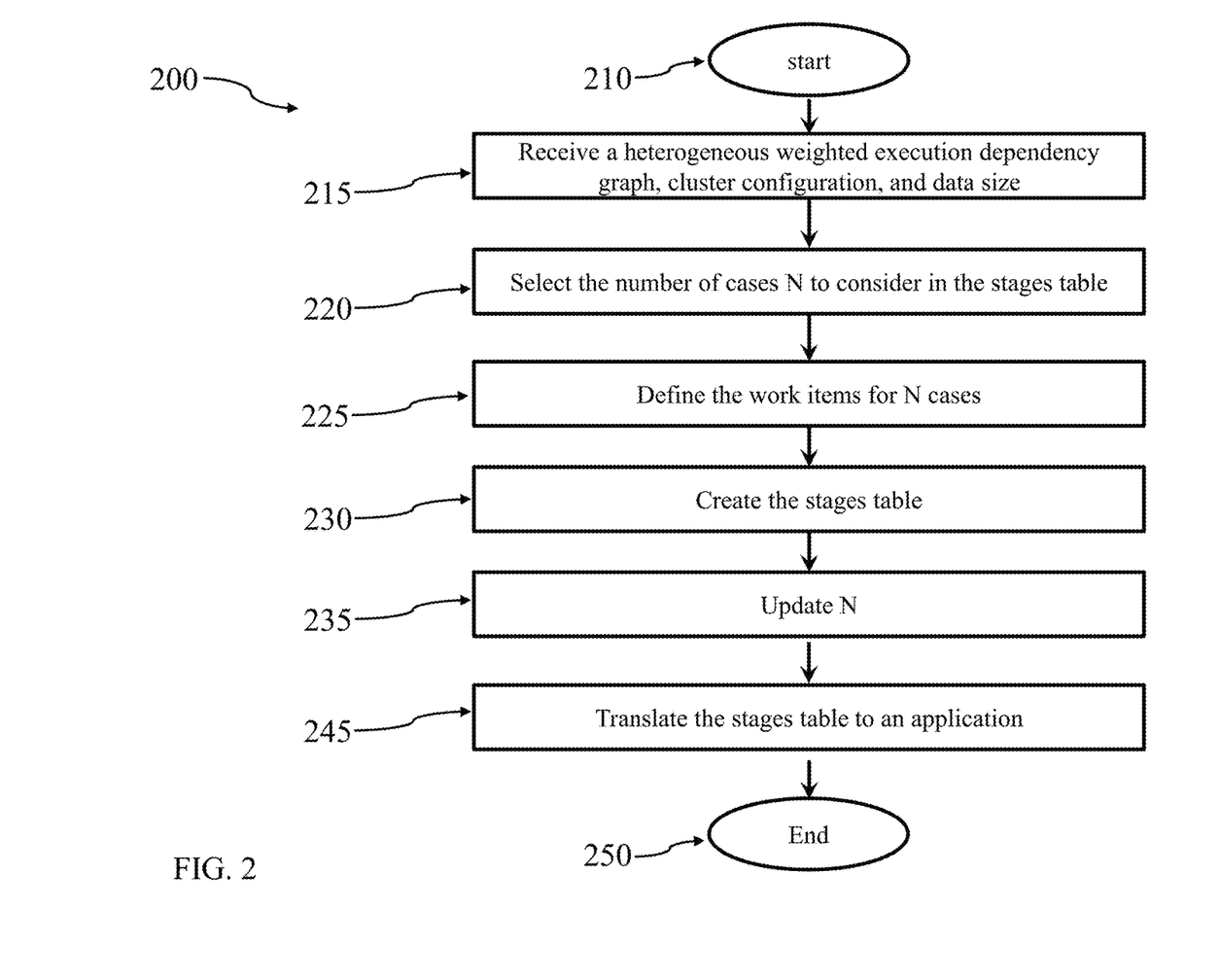
FIG. 2 illustrates a process for creating an efficient application for Big Data processing, according to an embodiment of the present invention.

A process for creating an efficient application for Big Data processing, according to an embodiment of the present invention, is shown in FIG. 2. The process starts in step 210. In step 215, a heterogeneous weighted execution dependency graph is received, along with the data size and cluster configuration. The cluster configuration contains information about the cluster, such as the number of nodes in the cluster. The choice of N is important in reducing the makespan. A greater N may translate to a more efficient application at run time, but can also increase the cost of the design time of the method. If the number of cases is small, N can equal the number of cases. In step 220, the system selects the number of cases N to consider in the stages table. In step 225, the system defines the work items for N cases. A work item is the pair of the case_id and an analytics identifier (analytics_module), where the analytics identifier provides an identifier for the particular module that must be used to perform the particular case according to the execution dependency graph. The work items list for a case will include all the pairs needed to complete the pipeline for that case. For example, the work items list for cases 1 and 2 with the dependency graph in FIG. 1 is {1A, 1B, 1C, 1D, 2A, 2B, 2C, 2D}. The work items list created in this step includes all the modules that need to be performed to complete the pipeline on the N cases.

Figure 3:
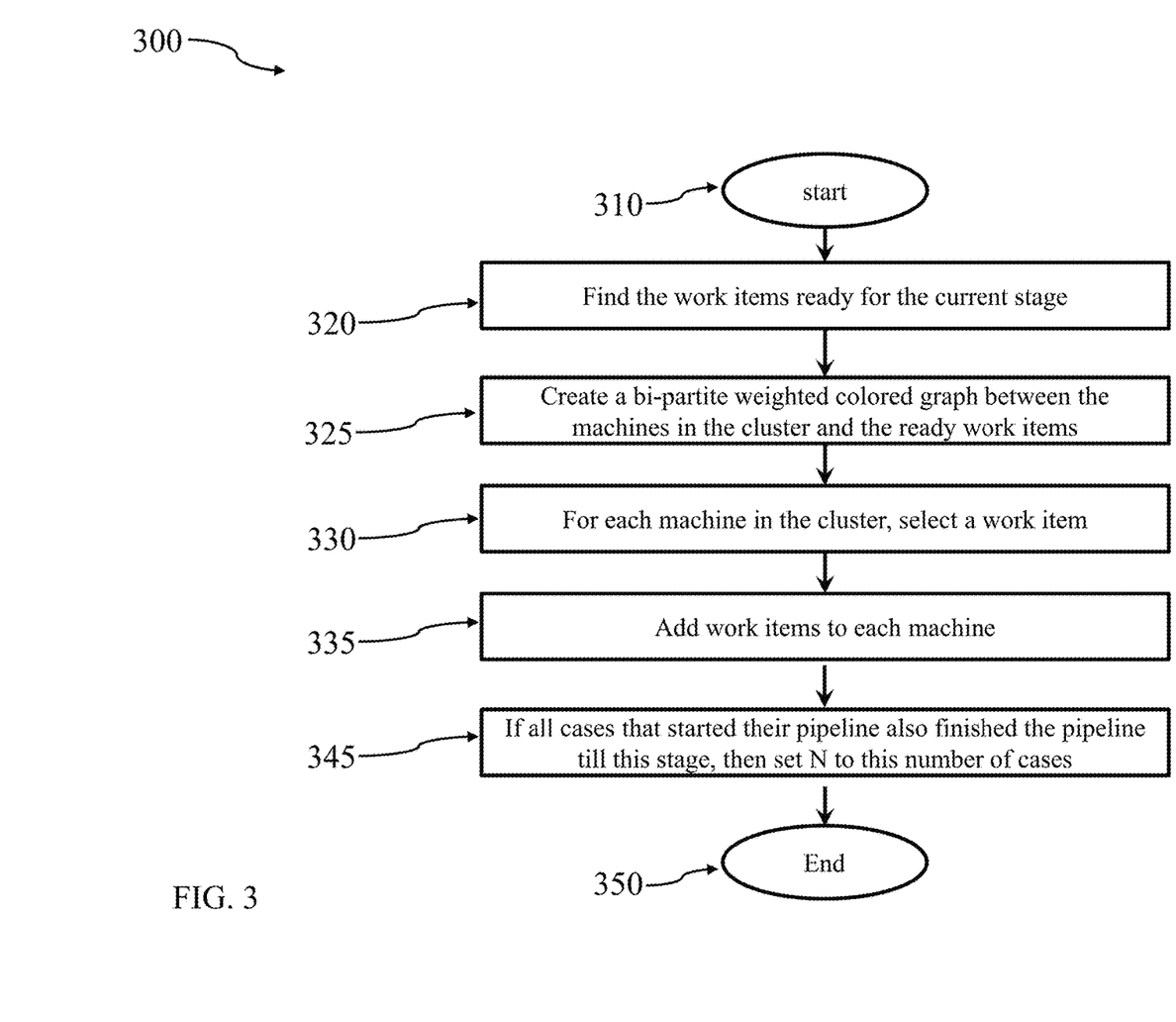
FIG. 3 illustrates a process for creating the stages table, according to an embodiment of the present invention.

In step 230, the system creates the stages table such that in each stage we try to find the best match between the ready work items and the machines in the cluster. A process for creating the stages table, according to an embodiment of the present invention, is shown in FIG. 3. In step 310, the process starts. In step 320, the system finds the work items ready for the current stage. A work item is ready when its input data is ready according to the Execution Dependency Graph In step 325, the system creates a bi-partite weighted colored graph between the machines in the cluster and the ready work items. The weight of an edge is the estimated execution time of the given module on the given machine. An edge to a heterogeneous module is colored red if the module runs better on that machine. An edge that preserves locality is colored yellow. Other edges are colored black.

In step 330, the system selects a work item for each machine in the cluster. For a machine with red edges, the system selects a red edge. For a machine with yellow edges, the system selects a yellow edge. Otherwise, the system selects a black edge but prefers an edge of a case that is the closest to the end of its pipeline.

In step 335, the system adds a work item to each machine. The work items are added in the same order that the work items are selected for each machine, preferring a red edge first, a yellow edge second, and a black edge third. The work items, in an embodiment, can be added such that the estimated processing time in each machine are approximately the same.

In step 345, if all cases that started their pipeline also finished the pipeline, the system sets N to this number of cases and marks a completion flag DONE to be true.

In step 235 of FIG. 3, the system updates N to the number of cases in the stages table. In step 245, the system translates the stages table to an application (data partitions and operations) in the specific Big Data processing platform. In an embodiment, the number of partitions in the initial data set is N and the partitions' size is approximately the same. Then in the program, follow the analytics steps and the partitions as defined by the above stages table. For example, the translation to SPARK will create an application that includes Resilient Distributed Dataset (RDD) and operations. In an embodiment, the number of partitions in the RDD are as the cluster size. The analytics steps are then translated to a mapValues( ) operation. The tasks assignment and repartition of RDD are according to the stages table. Finally, the system performs a collect( ) operation.

Finally, in step 250, the process ends. The estimated execution time for each module can be updated after each run so that a better application can be generated in the next run.

The system, in an embodiment, operates to have the heterogeneous modules perform on the nodes that will provide the greatest efficiency. Additionally, the workload is distributed to nodes in such a manner so as to keep the nodes operating at full capacity as often as possible. In addition, the system minimizes data transfers among cluster nodes. In various embodiments, the tradeoffs between data transfer among nodes and the use of computational resources can be balanced according to preference. The stages table can be created in a manner to optimize this relationship and reduce overall makespan.

Figure 4:
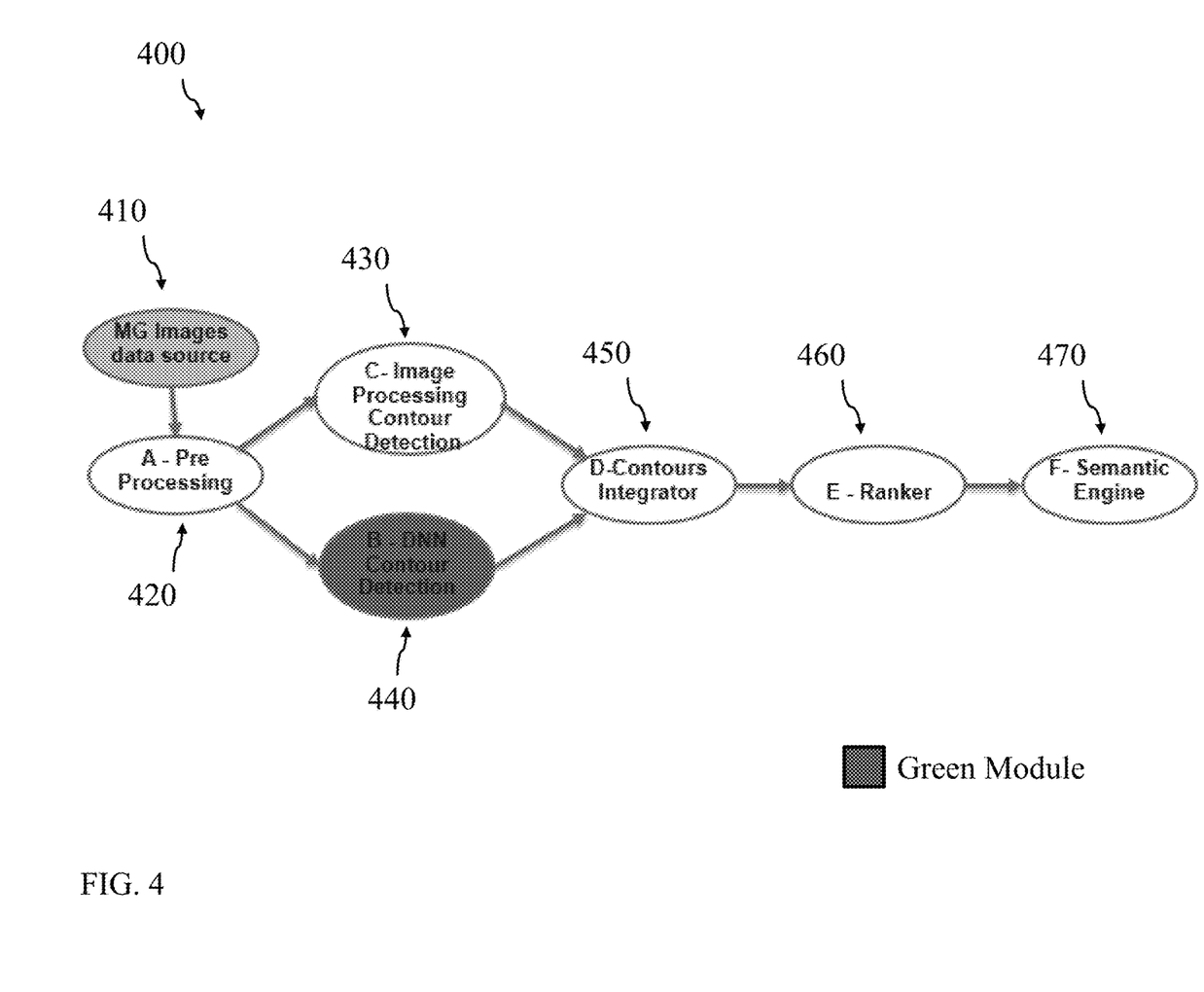
FIG. 4 illustrates an example execution dependency graph for Breast Mammogram (MG) Tumor pipeline, according to an embodiment of the present invention.

FIG. 4 illustrates an example execution dependency graph 400 for Breast Mammogram (MG) Tumor pipeline, according to an embodiment of the present invention. This example is setup such that the green module is a heterogeneous module that performs much better on GPU node than on CPU node in the cluster. In this example, the cost of reshuffling is negligible, e.g. the application is compute-intensive or the platform has a shared file system.

The MG images data source 410 includes 1000 independent images in 1000 cases; each image is approximately the same size. The keys of the images are ordered 1 to 1000. The estimated execution time for module B-DNN 440 is 1 second on GPU and 10 seconds on CPU. The estimated execution time for all other modules 420, 430, 450, 460, 470 is 1 second on both CPU and GPU. The cluster includes 2 machines; one machine with CPU and one machine with GPU. In this case, N=10 is selected, and the resulting stages table is below.

| Stage | CPU Machine | GPU Machine | Time (secs) |
|---|---|---|---|
| I | 1A | 2A | 1 |
| II | 1C | 2B | 1 |
| III | 2C | 1B | 1 |
| IV | 2D | 1D | 1 |
| V | 2E | 1E | 1 |
| VI | 2F | 1F | 1 |

Following the procedure previously detailed, N is now set to 2. The data will be divided to 2 partitions; each with 500 cases. One partition will be assigned to the CPU machine and the other to the GPU machine. We'll execute analytics A in each one of the machine. Then, we'll execute analytics C in the CPU machine and analytics B on the GPU machine. Then, we'll switch the partitions between the two machines and the CPU machine will perform analytics modules C, D, E, F while the GPU machine will perform analytics B, D, E, F. At the end, the results are collected.

Figure 5:
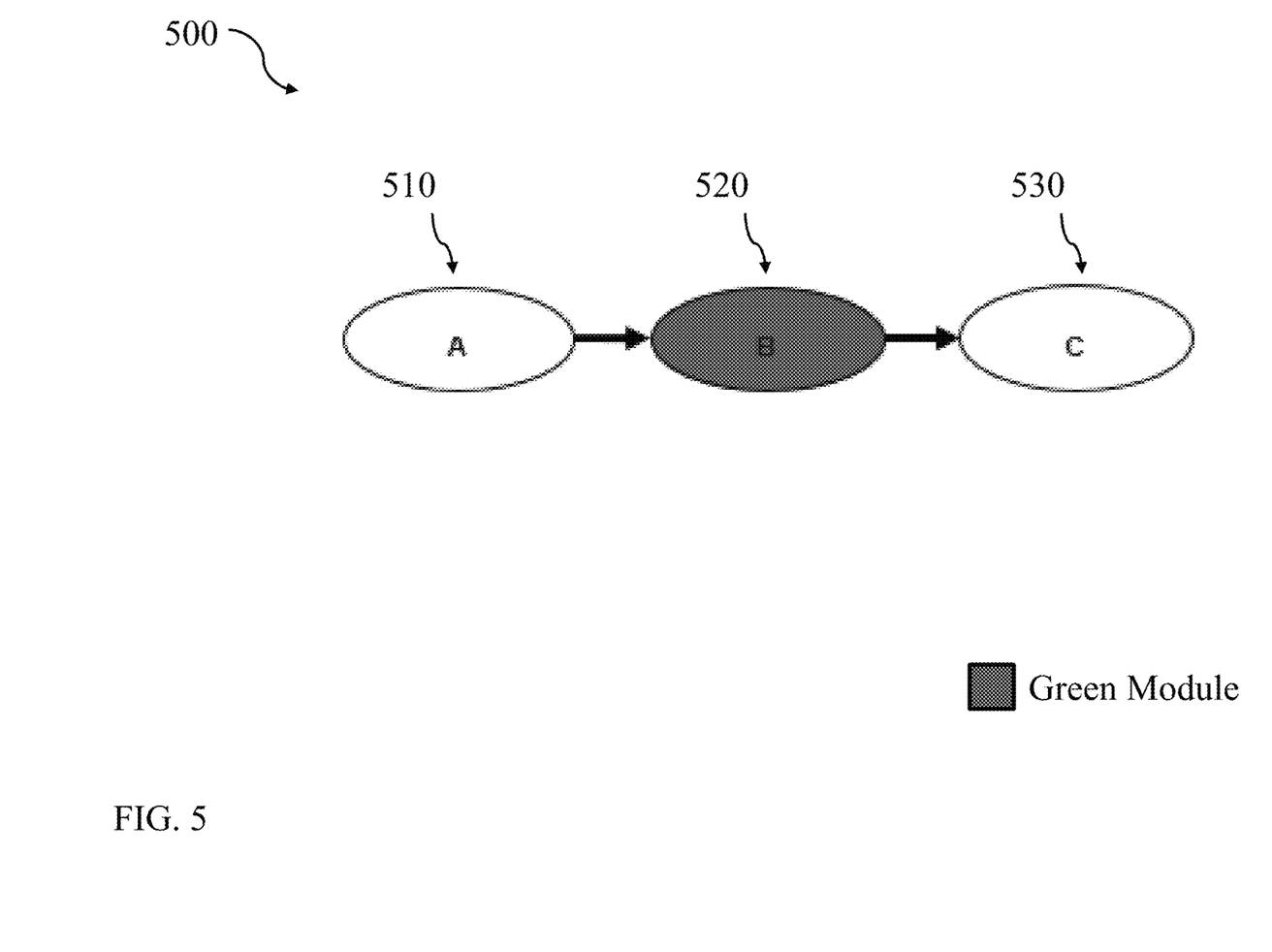
FIG. 5 illustrates a second example execution dependency graph, according to an embodiment of the present invention.

FIG. 5 illustrates a second example execution dependency graph 500, according to an embodiment of the present invention. The data includes 9 independent images in 9 cases; each of approximately the same size. The keys of the images are numbered 1 through 9. The estimated execution time for module B 520 is 2 seconds on GPU and 10 seconds on CPU. The estimated execution time for all other modules 510, 530 is 1 second both on CPU and GPU. The cluster includes two machines with CPU and one machine with GPU. In this case, N=9 is selected, and the resulting stages table is below.

| Stage | CPU Machine | GPU Machine | CPU Machine | Time (secs) |
|---|---|---|---|---|
| I | 1A | 2A | 3A | 1 |
| II | 4A, 5A | 2B | 6A, 7A | 2 |
| III | 8A, 9A | 1B | 2C | 2 |
| IV | 8B | 3B, 4B, 5B, 6B, 7B | 1C | 10 |
| V | 8C, 5C | 9B | 3C, 4C | 2 |
| VI | 6C | 9C | 7C | 1 |

Following the procedure previously detailed, N is now set to 9. The data will be divided to 9 partitions, each with 1 case. In stage 1, the three machines will execute analytics A on partitions 1, 2, 3 respectively. In the second stage, the CPU machine will execute analytics A on partitions 4, 5, the GPU machine will execute analytics B on partition 2, and the other CPU machine will execute analytics A on partitions 6 and 7. This ends stages I-II and similar to that, the next stages III-VI will be executed. At the end, the results are collected.

Figure 6:
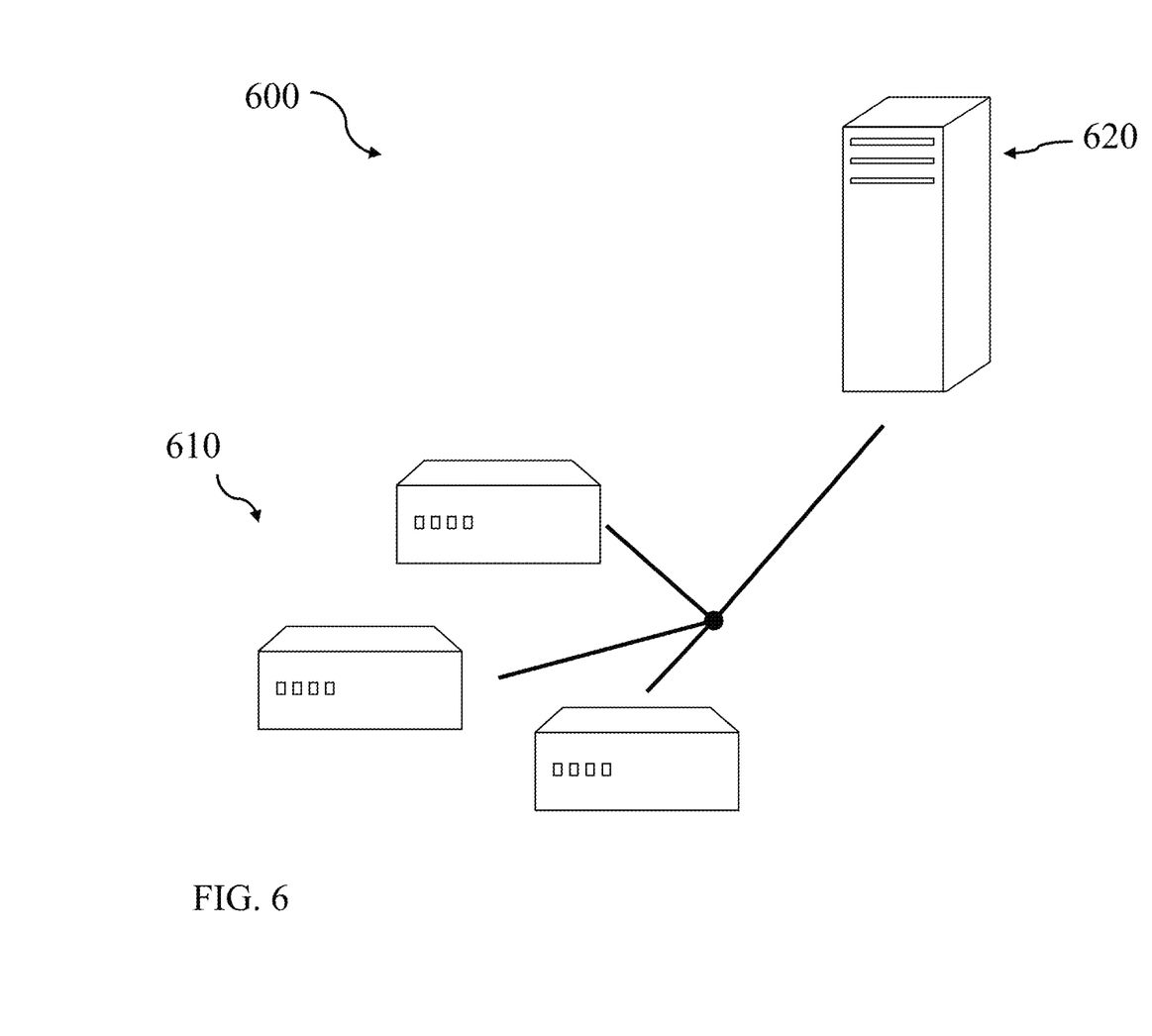
FIG. 6 illustrates a server and cluster node arrangement, according to an embodiment of the present invention.

The above-described techniques can be implemented in digital electronic circuitry, or in computer hardware, firmware, software, or in combinations of them. FIG. 6 illustrates a server and cluster node arrangement 600, according to an embodiment of the present invention. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. The computer program may reside, in part, on a server 620 that is operatively connected to a cluster of cluster nodes 610.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or is operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks; and optical disks. The processor and the memory can be supplemented by, or incorporated in special purpose logic circuitry.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks. The computing system can include clients and servers.

While the foregoing written description of the invention enables one of ordinary skill to make and use what is considered presently to be the best mode thereof, those of ordinary skill will understand and appreciate the existence of alternatives, adaptations, variations, combinations, and equivalents of the specific embodiment, method, and examples herein. Those skilled in the art will appreciate that the within disclosures are exemplary only and that various modifications may be made within the scope of the present invention. In addition, while a particular feature of the teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the teachings will be apparent to those skilled in the art from consideration of the specification and practice of the teachings disclosed herein. The invention should therefore not be limited by the described embodiment, method, and examples, but by all embodiments and methods within the scope and spirit of the invention. Accordingly, the present invention is not limited to the specific embodiments as illustrated herein, but is only limited by the following claims.

What is claimed is:

1. A system for application generation, the system comprising:
   a. a plurality of cluster nodes configured to execute an application, wherein each cluster node comprises hardware comprising a processor and a computer program executable by the processor, and wherein the hardware of at least some of the cluster nodes is different than the hardware of at least some of the other cluster nodes;
   b. a server comprising a processor and a computer program executable by the processor, operatively connected to the plurality of cluster nodes and configured to:
      i. receive a heterogeneous weighted execution dependency graph, which is heterogeneous based on the hardware of at least some of the cluster nodes being different than the hardware of at least some of the other cluster nodes, a cluster configuration, and a data size;
      ii. select a number representing a quantity of cases to consider, wherein each case comprises a plurality of items in the heterogeneous weighted execution dependency graph, the cluster configuration, and the data size;
      iii. define at least one work item for the number representing the quantity of cases;
      iv. create a stages table based on the at least one work item;
      v. update the number representing the quantity of cases to the number of cases in the stages table;
      vi. generate an application for execution on the plurality of cluster nodes by translating the stages table to form data partitions and operations to be performed; and
      vii. transmit the application to the plurality of cluster nodes for execution of the application on the plurality of cluster nodes.

2. The system of claim 1, wherein the at least one work item comprises a case identifier and an analytics identifier, wherein the case identifier identifies the data item that need to be processed, and the analytics identifier identifies a particular analytics module that must be executed on the particular case according to the execution dependency graph.

3. The system of claim 1, wherein the server is further configured to create the stages table by:
   a. finding a set of ready work items for a current stage;
   b. creating a bi-partite weighted colored graph between a set of machines in a cluster and the set of ready work items;

c. selecting a work item from the set of ready work items for a machine in the cluster; and
d. adding the selected work item to the machine.

4. The system of claim 1, wherein the application comprises data partitions and operations.

5. The system of claim 1, wherein the application comprises a Resilient Distributed Dataset.

6. A method for generating applications, the method comprising:
a. receiving, at a server comprising a processor and a computer program executable by the processor, the server operatively connected to a plurality of cluster nodes, wherein each cluster node comprises hardware comprising a processor and a computer program executable by the processor, and wherein the hardware of at least some of the cluster nodes is different than the hardware of at least some of the other cluster nodes, a heterogeneous weighted execution dependency graph, which is heterogeneous based on the hardware of at least some of the cluster nodes being different than the hardware of at least some of the other cluster nodes, a cluster configuration, and a data size;
b. selecting a number representing a quantity of cases to consider, wherein each case comprises a plurality of items in the heterogeneous weighted execution dependency graph, the cluster configuration, and the data size;
c. defining at least one work item for the number representing the quantity of cases;
d. creating a stages table based on the at least one work item;
e. updating the number representing the quantity of cases to the number of cases in the stages table; and
f. generating an application for execution on the plurality of cluster nodes by translating the stages table to form data partitions and operations to be performed.

7. The method of claim 6, wherein the at least one work item comprises a case identifier and an analytics identifier, wherein the case identifier identifies the data item that need to be processed, and the analytics identifier identifies a particular analytics module that must be executed on the particular case according to the execution dependency graph.

8. The method of claim 6, wherein creating the stages table comprises a. finding a set of ready work items for a current stage;
b. creating a bi-partite weighted colored graph between a set of machines in the cluster and the set of ready work items;
c. selecting a work item from the set of ready work items for a machine in the cluster; and
d. adding the selected work item to the machine.

9. The method of claim 8, wherein creating a bi-partite weighted colored graph comprises setting the weight of an edge to the estimated execution time of a given module on a given machine, coloring the edge red if the module runs better on that machine, yellow if it preserves locality, and otherwise coloring the edge black.

10. The method of claim 9, wherein selecting a work item for each machine in the cluster comprises:
a. selecting a red edge for a machine with red edges;
b. selecting a yellow edge for a machine without a red edge and with a yellow edge; and
c. selecting a black edge for a machine without a red or yellow edge.

11. The method of claim 10, wherein selecting a work item for each machine in the cluster comprises:
a. adding a red edge for a machine with red edges;
b. adding a yellow edge for a machine without a red edge and with a yellow edge; and
c. adding a black edge for a machine without a red or yellow edge.

12. The method of claim 6, wherein the application comprises data partitions and operations.

13. The method of claim 12, wherein the application comprises an Unstructured Information Management Architecture Asynchronous Scaleout application.

14. The method of claim 6, further comprising translating a set of analytics steps into a mapValues( ) operation.

15. The method of claim 6, further comprising the step of:
g. performing a collect( ) operation.

16. The method of claim 6, wherein the application comprises a Resilient Distributed Dataset.

17. The method of claim 16, wherein the number of partitions in the Resilient Distributed Dataset are the same as the cluster size.

18. The method of claim 16, wherein a task assignment and repartition of the Resilient Distributed Dataset is set according to the stages table.

* * * * *